(12) United States Patent
Richter

(10) Patent No.: US 9,592,722 B2
(45) Date of Patent: Mar. 14, 2017

(54) RETRACTABLE HEADLINER CORNER

(71) Applicant: Magna Car Top Systems of America, Inc., Auburn Hills, MI (US)

(72) Inventor: Wolfgang Richter, Commerce Township, MI (US)

(73) Assignee: MAGNA CAR TOP SYSTEMS OF AMERICA, INC., Auburn Hills, MI (US)

( * ) Notice: Subject to any disclaimer, the term of this patent is extended or adjusted under 35 U.S.C. 154(b) by 0 days.

(21) Appl. No.: 14/639,523

(22) Filed: Mar. 5, 2015

(65) Prior Publication Data
US 2016/0257185 A1 Sep. 8, 2016

(51) Int. Cl.
*B60J 7/16* (2006.01)
*B60J 7/185* (2006.01)
*B60J 7/00* (2006.01)
*B60R 13/02* (2006.01)
*B60J 7/12* (2006.01)

(52) U.S. Cl.
CPC ......... *B60J 7/0007* (2013.01); *B60R 13/0212* (2013.01); *B60J 7/1239* (2013.01); *B60J 7/1692* (2013.01); *B60J 7/1858* (2013.01)

(58) Field of Classification Search
CPC ...... B60J 7/1692; B60J 7/1858; B60J 7/0007; B60J 7/1239; B60R 13/0212
USPC ........................ 296/121, 224, 107.09, 107.12
See application file for complete search history.

(56) References Cited

U.S. PATENT DOCUMENTS 6,802,554 B1 * 10/2004 Just ........................ B60J 7/1286
296/107.09
7,021,696 B2 * 4/2006 Doncov ................. B60J 7/1851
292/DIG. 5

OTHER PUBLICATIONS

Photograph of "Flipper Door" sold on 2011-2015 Camaros.

* cited by examiner

*Primary Examiner* — Joseph D Pape
*Assistant Examiner* — Dana Ivey
(74) *Attorney, Agent, or Firm* — Brooks Kushman P.C.

(57) ABSTRACT

A headliner corner retractor for a convertible top. The corner retractor moves a front corner of the headliner between a covering position concealing a front portion of the side linkage and a contracted position in which clearance is provided for the side linkages to extend and retract the convertible top. The corner retractor is moved by a mechanical actuator including a cable and a hollow tubular housing.

13 Claims, 3 Drawing Sheets

RETRACTABLE HEADLINER CORNER

TECHNICAL FIELD

This disclosure relates to convertible tops that include a headliner.

BACKGROUND

A convertible top may be provided with a headliner that is retracted with the outer top cover material by bows that are moved by linkages on opposite lateral sides of the top. The convertible top is normally secured in its extended position to a windshield header.

One example of a prior art convertible top includes a trim door adjacent the A-pillar that is opened and closed as the top is retracted and extended. The trim door is provided to close-out, or trim, clearance areas of the headliner that are required to permit the linkages to extend and retract the top. The door adds to the part count, cost and complexity of the top. The trim door is an additional part that may require service if there is a problem with the trim door.

This disclosure is directed to solving the above problems and other problems as summarized below.

SUMMARY

According to one aspect of this disclosure, a convertible top is provided that has a windshield header supported by a pair of A-pillars. The top comprises a plurality of bows including a one bow, a pair of articulated side linkages supporting the one bow and several other bows. An outer cover is supported by the bows and movable by the side linkages between a retracted position and an extended position. A headliner is attached to the top below the cover in the extended position. The headliner has a front corner adjacent each of the A-pillars and each of the side linkages. A retractor is attached to the one bow and the front corner. The retractor is actuated to move the corner between a covering position concealing a front portion of the side linkages and a contracted position in which clearance is afforded for moving the side linkages between the retracted position and the extended position.

According to another aspect of this disclosure, a headliner corner retractor is provided for a convertible top having a windshield header supported by a pair of A-pillars. The convertible top includes a one bow and a pair of articulated side linkages supporting the one bow. A headliner is attached to the top and has a front corner adjacent each of the A-pillars and each of the side linkages. An outer cover is movable by the side linkages between a retracted position and an extended position. The headliner corner retractor includes a retractor attached to the one bow and the front corner of the headliner. The corner retractor is actuated to move the corner between a covering position concealing a front portion of the side linkages and a contracted position providing clearance for the side linkages as the top is moved between the retracted position and the extended position.

According to other aspects of this disclosure that may be combined with the above convertible top or headliner corner retractor, the retractor may further comprise a corner connector secured to the front corner of the headliner that is moved by a mechanical actuator laterally relative to the side linkages. The mechanical actuator may be a cable or rod received within a hollow tubular housing that has sufficient rigidity to move the corner in and out relative to the side linkages. The retractor may be attached to a latch assembly that is used to secure the one bow to the windshield header. The latch assembly may include a transverse linkage that is used to selectively secure the one bow of the top to the windshield header.

In another aspect of this disclosure, the side linkages may include a bottom trim flange that extends laterally inwardly. The front corner of the headliner may be moved to a position above the bottom trim flange in the extended position.

The above aspects of this disclosure and other aspects are described below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
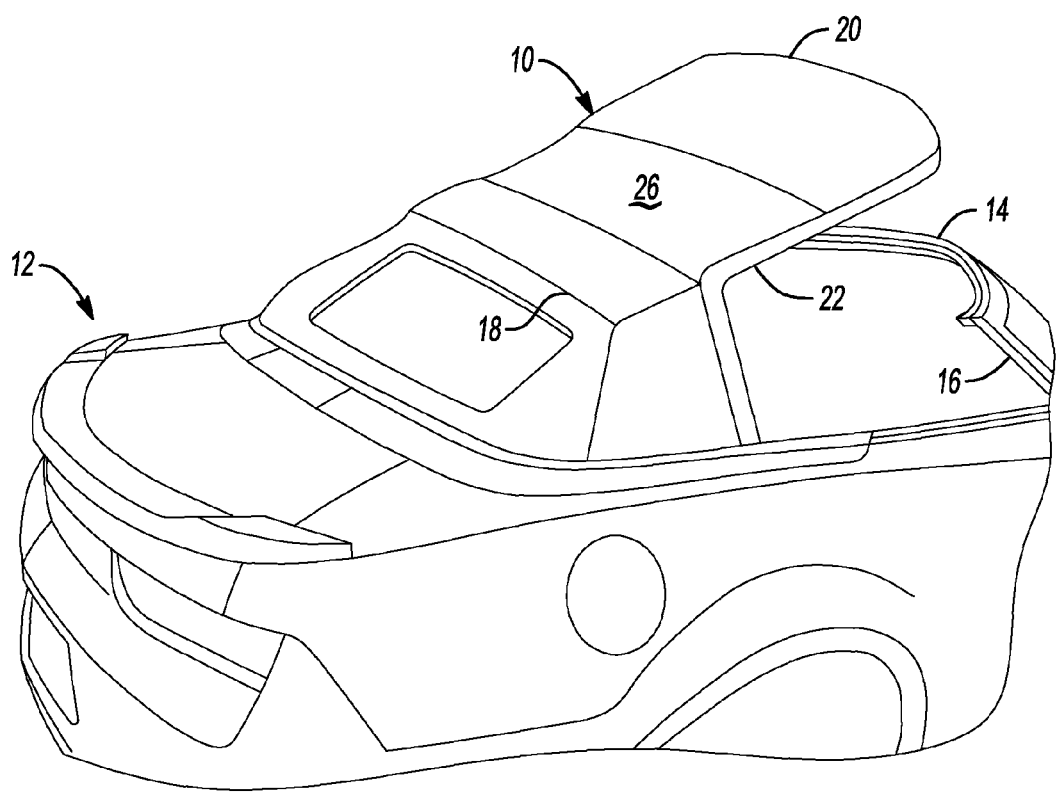
FIG. 1 is a fragmentary perspective view of a vehicle having a convertible top shown with the top partially open between its extended and retracted positions.

Referring to FIG. 1, a convertible top 10 is shown partially open on a vehicle 12. The vehicle 12 includes a windshield header 14 that is supported by a pair of A-pillars 16. A plurality of bows 18, including a one bow 20, are supported to be moved by a pair of articulated side linkages 22. The bows 18 and side linkages 22 support an outer cover 26. A headliner (shown in FIG. 2) is secured to the convertible top 10 below the outer cover 26. The headliner encloses the lower or inner side of the convertible top 10.

Figure 2:
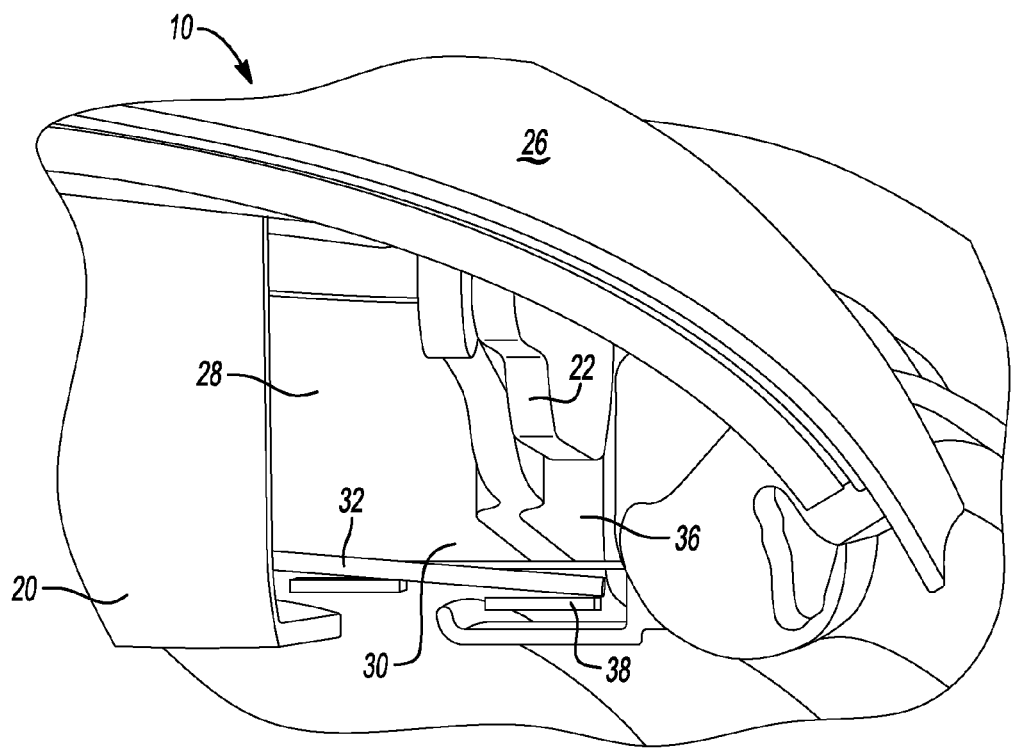
FIG. 2 is a fragmentary front perspective view of a front corner of a convertible top showing the retractable headliner corner made according to one embodiment of this disclosure.

A front corner 30 of the convertible top 10 is shown in FIG. 2. The front corner 30, as illustrated, includes the outer cover 26, the headliner 28, articulated side linkages 22 and the one bow 20. The side linkages 22 extend in the longitudinal vehicle direction and the one bow 20 extends transversely. A retractor 32 is connected to the headliner 28 at the front corner 30.

Figure 3:
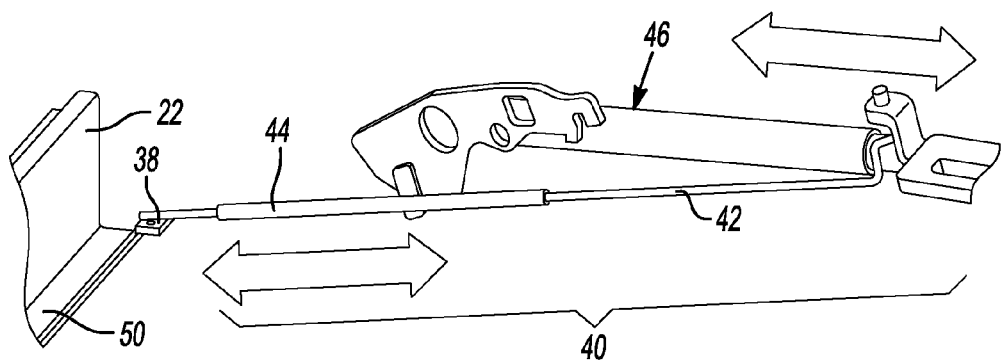
FIG. 3 is a fragmentary perspective view one embodiment of a retractor mechanism that may be used to extend and retract a headliner corner as shown in FIG. 2.

Referring to FIGS. 2 and 3, corner connector 38 is connected to the headliner 28 adjacent the front portion 36 of the side linkages 22. A mechanical actuator 40, or transverse linkage, is connected to the corner connector 38 and supports the corner connector 38 for movement in the transverse vehicle direction. The mechanical actuator 40 is a relatively rigid cable 42, such as a wire or rod, partially disposed within a hollow tubular housing 44. The mechanical actuator 40 moves with the one bow 20 as the convertible top 10 is extended and retracted. A latch assembly 46 is also provided on the one bow 20 that is of conventional design and may be used to secure the one bow 20 to the windshield header 40 when the convertible top 10 is in its extended position. The latch assembly 46 secures opposite ends of the one bow 20 to the windshield header 14 adjacent the A-pillars 16.

Referring to FIG. 3, the mechanical actuator 40 is shown. The mechanical actuator includes the cable 42 that is secured to the latch assembly 46 to be moved in the transverse vehicle direction between a covering position and a contracted position. In the covering position, the corner connector 38 is used to hold the headliner 28 to conceal the front corner 30. In the contracted position, the corner connector 38 is moved laterally inboard in the transverse vehicle direction to provide clearance for movement of the side linkages 22. The cable 42 may be shifted within the hollow tubular housing 44 at the same time that the latch assembly 46 is manipulated.

Figure 4:
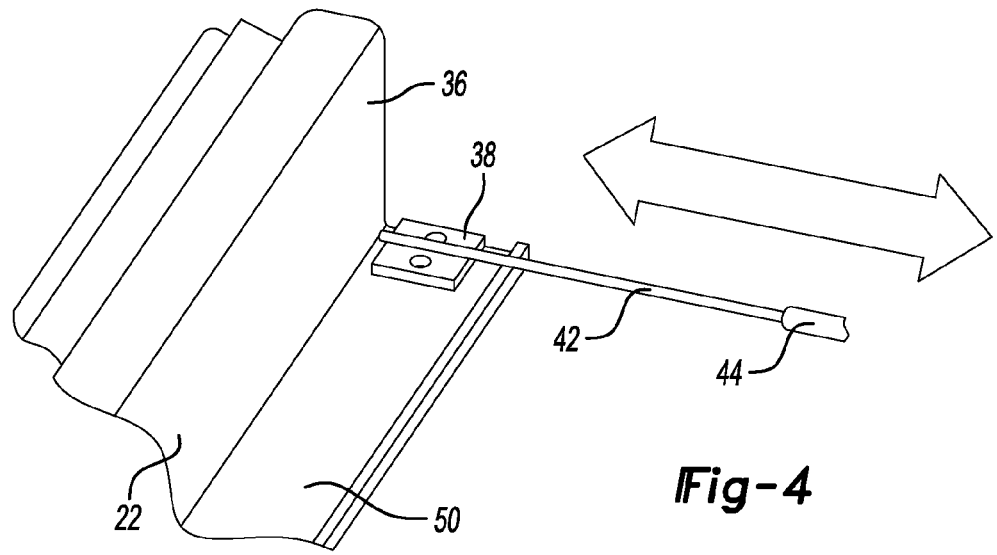
FIG. 4 is a fragmentary perspective view of the end of the retractor mechanism with the headliner (not shown) in the covering position.

Referring to FIG. 4, the corner connector 38 is shown in the covering position disposed above the bottom trim flange 50. Note, the headliner 28 is not shown in FIGS. 3 and 4 so that the relationship between the corner connector 38 and the bottom trim flange 50 is visible. Only the front portion 36 of the side linkages 22 is shown. It should be understood that the headliner 28 if shown would be connected to the corner connector 38 and would obscure the bottom trim flange 50. As previously described with reference to FIG. 3, the cable 42 and hollow tubular housing 44 cooperate to support the corner connector 38 above the bottom trim flange of the side linkage 22.

Figure 5:
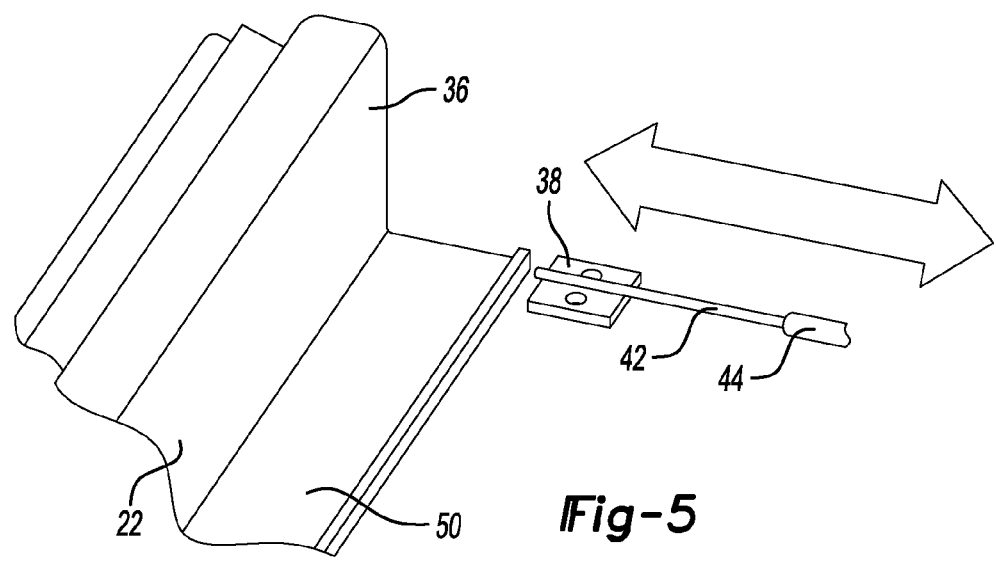
FIG. 5 is a fragmentary perspective view of the end of the retractor mechanism with the headliner (not shown) in the contracted position.

Referring to FIG. 5, the front portion 36 of the side linkage 22 is shown with the corner connector 38 in the contracted position. The corner connector 38, as shown in FIG. 5, has been moved in the transverse vehicle direction indicated by the arrow in FIG. 5 to a position in which the corner connector and the headliner (not shown in FIG. 5) that is attached to the corner connector 38 is clear of the bottom trim flange 50 of the side linkage 22.

In operation, beginning with the convertible top 10 in its extended position, the latch assembly 46 attaches the one bow 20 to the windshield header 14. The corner connector 38 is in the covering position, as shown in FIG. 4, holding the headliner 28 above the bottom trim flange 50. When it is desired to open the convertible top, the latch assembly 46 is disengaged to release the one bow 20 from the windshield header 14. At the same time, the cable 42 is moved inboard in the transverse vehicle direction to move the corner connector 38 away from the side linkage 22. The convertible top 10 is then retracted in the normal manner until the convertible top 10 is in its retracted position.

When it is desired to close the convertible top and move it to its extended position, the convertible top moves through its normal closing cycle until the windshield header 14 is engaged by the one bow 20. The corner connector 38 is held in the contracted position until the one bow 20 approaches the windshield header 14. The latch assembly 46 is then utilized to secure the one bow 20 to the windshield header 14. At the same time, the cable 42 is extended to its covering position, as shown in FIG. 4, with the corner connector 38 being disposed above the bottom trim flange 50 and below the outer cover 26.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A convertible top for a vehicle having a windshield header supported by a pair of A-pillars, the top comprising:
    a plurality of bows including a one bow that has a latch assembly for securing the one bow to the windshield header;
    a pair of articulated side linkages supporting the bows;
    an outer cover supported by the bows and movable by the side linkages between a retracted position and an extended position;
    a headliner attached to the top below the cover in the extended position, wherein the headliner has a front corner adjacent each of the A-pillars and each of the side linkages; and
    a retractor attached to the front corner that is actuated by the latch assembly to move the corner between a covering position to conceal a front portion of the side linkages and a contracted position to provide clearance for moving the side linkages between the retracted position and an extended position.

2. The convertible top of claim 1 wherein the retractor further comprises a corner connector secured to the front corner of the headliner that is moved by a mechanical actuator laterally relative to the side linkages.

3. The convertible top of claim 2 wherein the mechanical actuator is a cable received within a hollow tubular housing.

4. The convertible top of claim 1 wherein the latch assembly includes a transverse linkage attached to the one bow that is used to selectively secure the one bow of the top to the windshield header.

5. The convertible top of claim 1 wherein the side linkages include a bottom trim flange that extends laterally inwardly therefrom, and wherein the front corner of the headliner is disposed above the bottom trim flange in the extended position.

6. A headliner corner retractor for a convertible top having a windshield header supported by a pair of A-pillars, the convertible top including a one bow, a pair of articulated side linkages supporting the one bow, a headliner attached to the top that has a front corner adjacent each of the A-pillars and each of the side linkages, and an outer cover movable by the side linkages between a retracted position and an extended position, the headliner corner retractor further comprising:
    a retractor attached to a latch assembly used to selectively secure the one bow to the windshield header on a first end and is attached on a second end to the front corner, wherein the retractor is actuated to move the corner between a covering position concealing a front portion of the side linkages and a contracted position exposing the side linkages as the top is moved between the retracted position and the extended position.

7. The headliner corner retractor of claim 6 wherein the retractor further comprises a corner connector secured to the front corner of the headliner that is moved by a mechanical actuator laterally relative to the side linkages.

8. The headliner corner retractor of claim 7 wherein the mechanical actuator is a rigid cable received within a hollow tubular housing.

9. The headliner corner retractor of claim 8 wherein the latch assembly includes a transverse linkage housed within the one bow that to selectively secures the one bow of the top to the windshield header.

10. The headliner corner retractor of claim 9 wherein the side linkages include a bottom trim flange that extends laterally inwardly therefrom, and wherein the front corner of the headliner is disposed above the bottom trim flange in the extended position.

11. A headliner corner retractor for a convertible top having a windshield header supported by a pair of A-pillars, the convertible top including a one bow, a pair of articulated side linkages supporting the one bow, a headliner attached to the top that has a front corner adjacent each of the A-pillars and each of the side linkages, and an outer cover movable by the side linkages between a retracted position and an extended position, wherein the improvement comprises:

a retractor attached to the one bow and the front corner, wherein the retractor is actuated to move the corner between a covering position concealing a front portion of the side linkages and a contracted position exposing the side linkages as the outer cover is moved between the retracted position and the extended position, a corner connector secured to the front corner of the headliner is moved by a cable received within a hollow tubular housing attached to a latch assembly that is used to secure the one bow to the windshield header.

12. The headliner corner retractor of claim 11 wherein the latch assembly includes a transverse linkage at least partially housed within the one bow that is used to selectively secure the one bow of the top to the windshield header.

13. The headliner corner retractor of claim 11 wherein the side linkages include a bottom trim flange that extends laterally inwardly therefrom, and wherein the front corner of the headliner is disposed above the bottom trim flange in the extended position.

\* \* \* \* \*